US011028216B2

(12) United States Patent
Sasaki

(10) Patent No.: US 11,028,216 B2
(45) Date of Patent: Jun. 8, 2021

(54) POLYCARBODIIMIDE COPOLYMER

(71) Applicant: NISSHINBO CHEMICAL INC., Tokyo (JP)

(72) Inventor: Takahiro Sasaki, Chiba (JP)

(73) Assignee: NISSHINBO CHEMICAL INC., Tokyo (JP)

( * ) Notice: Subject to any disclaimer, the term of this patent is extended or adjusted under 35 U.S.C. 154(b) by 0 days.

(21) Appl. No.: 16/344,749

(22) PCT Filed: Nov. 14, 2017

(86) PCT No.: PCT/JP2017/040863
§ 371 (c)(1),
(2) Date: Apr. 24, 2019

(87) PCT Pub. No.: WO2018/092752
PCT Pub. Date: May 24, 2018

(65) Prior Publication Data
US 2019/0270837 A1 Sep. 5, 2019

(30) Foreign Application Priority Data
Nov. 18, 2016 (JP) .............................. JP2016-224618

(51) Int. Cl.
*C08G 18/36* (2006.01)
*C08G 18/76* (2006.01)
*C08G 18/83* (2006.01)
*C08L 33/06* (2006.01)
*C08L 67/00* (2006.01)
*C08G 18/48* (2006.01)
*C08G 18/79* (2006.01)
*C08G 18/32* (2006.01)

(52) U.S. Cl.
CPC ............ *C08G 18/36* (2013.01); *C08G 18/32* (2013.01); *C08G 18/48* (2013.01); *C08G 18/7621* (2013.01); *C08G 18/7657* (2013.01); *C08G 18/7671* (2013.01); *C08G 18/79* (2013.01); *C08G 18/83* (2013.01); *C08G 18/833* (2013.01); *C08L 33/06* (2013.01); *C08L 67/00* (2013.01)

(58) Field of Classification Search
CPC ......... C08L 33/06; C08L 67/00; C08G 18/36; C08G 18/833; C08G 18/83; C08G 18/095; C08G 18/69; C08G 18/7621; C08G 18/32; C08G 18/6757; C08G 18/6771; C08G 18/7685; C08G 18/79; C08G 18/48; C08G 18/7657; C08G 18/7671
See application file for complete search history.

(56) References Cited

U.S. PATENT DOCUMENTS

| 2,941,966 A * | 6/1960 | Campbell ............... C08G 18/10 521/155 |
|---|---|---|
| 3,960,950 A | 6/1976 | Hansen |
| 4,169,866 A | 10/1979 | Von Bonin et al. |
| 5,574,083 A | 11/1996 | Brown et al. |
| 2004/0176547 A1 | 9/2004 | Sadayori et al. |
| 2005/0261448 A1 | 11/2005 | Takahashi et al. |
| 2010/0076153 A1 | 3/2010 | Hesselmans et al. |
| 2013/0102697 A1 | 4/2013 | Shinchi et al. |
| 2013/0144006 A1 | 6/2013 | Derksen et al. |
| 2014/0255560 A1 | 9/2014 | Eklund et al. |

FOREIGN PATENT DOCUMENTS

| CN | 1105688 A | 7/1995 |
|---|---|---|
| CN | 1526751 A | 9/2004 |
| CN | 1699438 A | 11/2005 |
| CN | 101374876 A | 2/2009 |
| CN | 101575405 A | 11/2009 |
| CN | 102070863 A | 5/2011 |
| CN | 102741311 A | 10/2012 |
| CN | 103119084 A | 5/2013 |
| CN | 105142896 A | 12/2015 |
| EP | 0943642 A1 | 9/1999 |
| EP | 3582005 A1 | 12/2019 |
| EP | 3582006 A1 | 12/2019 |
| JP | 53-98398 A | 8/1978 |
| JP | 10-41175 A | 2/1998 |
| JP | 10-195160 A | 7/1998 |

(Continued)

OTHER PUBLICATIONS

Extended European Search Report for European Application No. 17871311.1, dated May 12, 2020.
International Search Report (PCT/ISA/210) issued in PCT/JP2017/040863, dated Feb. 20, 2018.
Author Unkown, "Technology Progress in Petrochemical Industry," Sinopec Press, Apr. 1, 2002, pp. 335 (total 6 pages), with an English abstract.
Chinese Office Action and Search Report, dated Jan. 22, 2021, for Chinese Application No. 201780070323.X, with and English translation of the Chinese Office Action.
Liu et al., "Handbook of Polyurethane Raw Materials and Additives," Chemical Industry Press, Beijing, Apr. 2005 (Apr. 30, 2005), pp. 212 (total 8 pages), with an English translation.

(Continued)

*Primary Examiner* — Irina S Zemel
(74) *Attorney, Agent, or Firm* — Birch, Stewart, Kolasch & Birch, LLP

(57) ABSTRACT

To provide a polycarbodiimide copolymer and a modified polycarbodiimide copolymer each suitable for a curing agent that can allow a cured product of a carboxy group-containing resin composition to be improved in flexibility without any loss of water resistance, as well as a curing agent of a carboxy group-containing resin composition, and a carboxy group-containing resin composition. The present invention enables a cured product to be enhanced in water resistance due to introduction of a predetermined soft segment into a polycarbodiimide molecule, in use for a curing agent, and also enables a carboxy group-containing resin composition to be enhanced in storage stability due to modification with an aliphatic amine or an aromatic heterocyclic amine.

14 Claims, No Drawings

(56) References Cited

FOREIGN PATENT DOCUMENTS

| JP | 2002-25342 A | 1/2002 |
|---|---|---|
| JP | 2007-138080 A | 6/2007 |
| JP | 2008-214366 A | 9/2008 |
| JP | 2010-275425 A | 12/2010 |
| JP | 2013-112755 A | 6/2013 |
| JP | 2015-147838 A | 8/2015 |
| JP | 2015-147839 A | 8/2015 |
| WO | WO 2009/037826 A1 | 3/2009 |
| WO | WO 2015/191351 A1 | 12/2015 |
| WO | WO 2016/163284 A1 | 10/2016 |
| WO | WO 2016/163285 A1 | 10/2016 |

OTHER PUBLICATIONS

Tong et al., "Development and Prospect of the Study on Polycarbodiimide Crosslinking Agent," Westleather, vol. 32, No. 3, Feb. 2010 (Feb. 28, 2010), pp. 27-31, with an English abstract.

Xiaoyan et al., "Properties and Development of Polycarbodiimide Crosslinker," China Leather, vol. 39, No. 1, Jan. 2010 (Jan. 30, 2010), pp. 49-51, with an English abstract.

Zhong et al., "Application of Surfactants in Pharmacy," People's Medical Publishing House, Beijing, 1995, pp. 15 and 17, (total 11 pages), with an English translation.

* cited by examiner

POLYCARBODIIMIDE COPOLYMER

TECHNICAL FIELD

The present invention relates to a polycarbodiimide copolymer comprising a soft segment in the molecule, and a modified polycarbodiimide copolymer obtained by modifying the polycarbodiimide copolymer. The present invention also relates to a curing agent of a carboxy group-containing resin, comprising the polycarbodiimide copolymer, and a carboxy group-containing resin composition.

BACKGROUND ART

There are known a modified polycarbodiimide composition and a modified polycarbodiimide that are improved in preservation stability in a solution (see, for example, Patent Literature 1). A polycarbodiimide copolymer having a soft segment in the molecule is excellent in flexibility, but has the problem of causing a cured product of a composition comprising the copolymer to be inferior in water resistance due to a high-polarity of the soft segment used.

There is also known a polycarbodiimide copolymer where a polyester polyol and a polycarbonate polyol each serving as a hydrolysis resistance stabilizer of polyethylene terephthalate are introduced to an aromatic polycarbodiimide (see, for example, Patent Literature 2). The polycarbodiimide copolymer, however, is increased in the amount thereof compounded and thus is increased in the respective numbers of ester groups and carbonate groups in the case of use for a curing agent, and therefore has the problems of higher moisture-absorption properties of polyethylene terephthalate and deterioration in water resistance.

CITATION LIST

Patent Literatures

Patent Literature 1: JP 2007-138080 A
Patent Literature 2: JP 2015-147838 A

SUMMARY OF INVENTION

Technical Problem

An object of the present invention is to provide a polycarbodiimide copolymer suitable for a curing agent that can allow a cured product of a carboxy group-containing resin composition to be improved in flexibility without any loss of water resistance, and a modified polycarbodiimide copolymer obtained by modifying the polycarbodiimide copolymer, as well as a curing agent of a carboxy group-containing resin, and a carboxy group-containing resin composition.

Solution to Problem

The present inventor has made intensive studies for achieving the above object, and as a result, has found that a predetermined soft segment is introduced into a polycarbodiimide molecule to result in an enhancement in water resistance of a cured product in use for a curing agent. The present inventor has further found that a carboxy group-containing resin composition comprising a polycarbodiimide copolymer including a soft segment in the molecule is also excellent in storage stability, to thereby complete the present invention.

That is, the present invention is as follows.
[1] A polycarbodiimide copolymer comprising a soft segment comprising a residue in which a hydroxyl group is removed from at least one polyol selected from the group consisting of castor oil, a castor oil-based polyol having 2 to 10 functional groups, and a long-chain aliphatic diol represented by HO—$R^1$—OH wherein $R^1$ represents a linear or branched, saturated or unsaturated alkylene group containing 30 to 150 carbon atoms, and a hard segment composed of polycarbodiimide derived from an aromatic diisocyanate compound, the hard segment bonding to the soft segment through a urethane bond.
[2] The polycarbodiimide copolymer according to [1], wherein the aromatic diisocyanate is at least one selected from the group consisting of 4,4'-diphenylmethane diisocyanate, 2,4-tolylene diisocyanate, 2,6-tolylene diisocyanate and 4,4'-diisocyanato-3,3'-dimethylbiphenyl.
[3] The polycarbodiimide copolymer according to [1] or [2], wherein the polyol is castor oil or a castor oil-based polyol having 2 to 10 functional groups.
[4] The polycarbodiimide copolymer according to [3], wherein the polyol is a castor oil-based polyol having 2 to 3 functional groups.
[5] A curing agent of a carboxy group-containing resin, comprising the polycarbodiimide copolymer according to any one of [1] to [4].
[6] A carboxy group-containing resin composition comprising the curing agent according to [5] and a carboxy group-containing resin.
[7] A modified polycarbodiimide copolymer obtained by modifying the polycarbodiimide copolymer according to any one of [1] to [4] with an aliphatic amine or an aromatic heterocyclic amine.
[8] The modified polycarbodiimide copolymer according to [7], wherein the aliphatic amine is at least one selected from the group consisting of diethylamine, diisopropylamine, tert-butylethylamine, di-n-butylamine, di-sec-butylamine, di-tert-butylamine, dicyclohexylamine, 2-methylpiperidine and 2,6-dimethylpiperidine.
[9] The modified polycarbodiimide copolymer according to [8], wherein the aliphatic amine is diisopropylamine.
[10] The modified polycarbodiimide copolymer according to [7], wherein the aromatic heterocyclic amine is at least one selected from the group consisting of 3,5-dimethylpyrazole, imidazole, 2-methylimidazole, 2-ethyl-4-methylimidazole, 2-phenylimidazole and 2-phenyl-4-methylimidazole.
[11] A curing agent of a carboxy group-containing resin, comprising the modified polycarbodiimide copolymer according to any one of [7] to [10].
[12] A carboxy group-containing resin composition comprising the curing agent according to [11] and a carboxy group-containing resin.

Advantageous Effects of Invention

The polycarbodiimide copolymer or the modified polycarbodiimide copolymer of the present invention can be used for a curing agent, thereby not only allowing a cured product of a carboxy group-containing resin composition to be enhanced in water resistance and to have excellent flexibility, but also allowing a carboxy group-containing resin composition to be excellent in storage stability.

DESCRIPTION OF EMBODIMENTS

Polycarbodiimide Copolymer

The polycarbodiimide copolymer of the present invention comprises a hard segment composed of a predetermined polycarbodiimide and a soft segment composed of a predetermined polyol. The polycarbodiimide copolymer can be used for a curing agent, thereby providing a cured product of a carboxy group-containing resin composition, which is improved in flexibility and is excellent in water resistance. The cured product is excellent in flexibility and water resistance, and thus exerts an excellent effect of being enhanced in durability in the case of use for exterior paint and electronic component applications.

The polycarbodiimide copolymer can allow a carboxy group-containing resin composition comprising a curing agent to be excellent in storage stability.

Polycarbodiimide

The polycarbodiimide copolymer of the present invention comprises a hard segment and a soft segment, the hard segment being composed of a polycarbodiimide. The polycarbodiimide mentioned in the present invention refers to a structural unit comprised in the polycarbodiimide copolymer.

The polycarbodiimide in the polycarbodiimide copolymer of the present invention means a polycarbodiimide derived from an aromatic diisocyanate compound. The aromatic diisocyanate compound here means an isocyanate compound having two isocyanate groups in the molecule, and refers to an isocyanate compound where two isocyanate groups present in the molecule are directly bound to an aromatic ring.

Examples of a polycarbodiimide derived from a diisocyanate compound include a polycarbodiimide derived from an aromatic diisocyanate compound and a polycarbodiimide derived from an aliphatic diisocyanate compound. The polycarbodiimide derived from an aromatic diisocyanate compound is excellent in heat resistance as compared with the polycarbodiimide derived from an aliphatic diisocyanate compound, and thus the polycarbodiimide derived from an aromatic diisocyanate compound is preferable.

The polycarbodiimide derived from a diisocyanate compound has, for example, a group represented by the following general formula (1).

wherein R represents a residue in which an isocyanate group is removed from the diisocyanate compound.

Diisocyanate; Component (a)

Examples of an aromatic diisocyanate compound (hereinafter, also referred to as "diisocyanate (a)" or "component (a)"), from which the polycarbodiimide in the polycarbodiimide copolymer of the present invention is derived, include phenylene diisocyanate, tolylene diisocyanate, tolidine diisocyanate, 1,5-naphthalene diisocyanate, diphenylmethane diisocyanate, diphenyldimethylmethane diisocyanate and diphenyl ether diisocyanate. Such components may be used singly or in combinations of two or more kinds thereof. A preferable aromatic diisocyanate compound is at least one selected from the group consisting of tolylene diisocyanate, tolidine diisocyanate and diphenylmethane diisocyanate, and more preferable one is tolylene diisocyanate, from the viewpoint of heat resistance.

Polyol

The polycarbodiimide copolymer of the present invention is obtained by a reaction of the polycarbodiimide and a polyol (hereinafter, also referred to as "polyol (b)" or "component (b)"). The polycarbodiimide copolymer of the present invention comprises a soft segment composed of the polyol. Herein, the polyol means a compound having two or more hydroxyl groups in the molecule.

The polycarbodiimide copolymer of the present invention comprises a di- or higher-valent residue in which a hydroxyl group is removed from the polyol, between carbodiimide groups, and is well miscible with a carboxy group-containing resin and is increased in the reaction rate with a carboxy group, thereby resulting in an enhancement in heat resistance of the carboxy group-containing resin, and an enhancement in water resistance of the carboxy group-containing resin due to a lower polarity of the polyol (b). The polycarbodiimide copolymer can also impart flexibility to the carboxy group-containing resin.

Polyol; Component (b)

Examples of the component (b) include castor oil, a castor oil-based polyol having 2 to 10 functional groups, and a long-chain aliphatic diol represented by HO—$R^1$—OH wherein $R^1$ represents a linear or branched, saturated or unsaturated alkylene group containing 30 to 150 carbon atoms. The term "functional group" here means a hydroxyl group.

Examples of the castor oil-based polyol include those derived with castor oil as a raw material. Specific examples include URIC H-30, URIC H-62 and URIC Y-403 manufactured by Itoh Oil Chemical Co., Ltd.; and HS 2G-120, HS SG-160R, HS 2G-270B, HS 2B-5500 and HS KA-001 manufactured by Hokoku Co., Ltd., but are not limited thereto.

Examples of the long-chain aliphatic diol include polyalkylene diol. Specific examples include G series of polybutadiene having hydroxyl groups at both ends and GI series of hydrogenated polybutadiene having hydroxyl groups at both ends manufactured by Nippon Soda Co., Ltd., liquid polybutadiene Poly bd (registered trademark) having a hydroxyl group at an end and liquid polyolefin EPOL (registered trademark) having a hydroxyl group at an end manufactured by Idemitsu Kosan Co., Ltd., and polyhydroxy polyolefin oligomer Polytel (registered trademark) manufactured by Mitsubishi Chemical Corporation, but are not limited thereto.

The long-chain aliphatic diol preferably has a number average molecular weight of 500 or more and 5000 or less, more preferably 500 or more and 3000 or less, further preferably 500 or more and 2000 or less, from the viewpoint of an active component.

Among them, the castor oil-based polyol is preferable and a castor oil-based polyol having two functional groups are further preferable from the viewpoint of compatibility.

End-Capping

It is preferable in the polycarbodiimide copolymer of the present invention that an end isocyanate remaining as an end of the hard segment be capped with an end-capping agent (hereinafter, also referred to as "end-capping agent (c)" or "component (c)"). Thus, the polycarbodiimide copolymer can be enhanced in heat resistance, production stability and storage stability, resulting in an enhancement in quality.

End-Capping Agent; Component (c)

Examples of the component (c) include monoalcohol, monophenol, monoisocyanate and monoamine.

Examples of the monoalcohol include methanol, ethanol, cyclohexanol, polyethylene glycol monomethyl ether and polypropylene glycol monomethyl ether.

Examples of the monophenol include phenol, methylphenol, dimethylphenol and naphthol.

Examples of the monoisocyanate include lower alkyl monoisocyanates such as methyl isocyanate, ethyl isocyanate, propyl isocyanate, n-butyl isocyanate, sec-butyl isocyanate and tert-butyl isocyanate; alicyclic monoisocyanates such as cyclohexyl isocyanate; and aromatic monoisocyanates such as phenyl isocyanate, tolyl isocyanate, dimethylphenyl isocyanate and 2,6-diisopropylphenyl isocyanate.

Examples of the monoamine include primary amines such as butylamine and cyclohexylamine; and secondary amines such as diethylamine, dibutylamine and dicyclohexylamine.

Among them, monoalcohol or monoisocyanate is preferable, monoisocyanate is more preferable, aromatic monoisocyanate is further preferable and phenyl isocyanate is still further preferable from the viewpoint of reactivity.

Such end-capping agents (c) may be used singly or in combinations of two or more kinds thereof.

Equivalent of Carbodiimide

The equivalent of carbodiimide of the polycarbodiimide copolymer (chemical formula weight per mole of carbodiimide group) is preferably 200 to 1,500, more preferably 250 to 1,250, further preferably 300 to 1,000 from the viewpoints of hydrolysis resistance stability, melt viscosity and solution viscosity of a carboxy group-containing resin composition.

Number Average Molecular Weight of Polycarbodiimide Copolymer

The polycarbodiimide copolymer preferably has a number average molecular weight of 250 to 50,000, more preferably 300 to 10,000, further preferably 400 to 5,000, still further preferably 500 to 3,000 from the viewpoints of hydrolysis resistance, melt viscosity and solution viscosity of a carboxy group-containing resin composition. The number average molecular weight is measured by gel permeation chromatography (GPC method) with polystyrene as a standard substance.

Method for Producing Polycarbodiimide Copolymer

The polycarbodiimide copolymer of the present invention can be produced by a known method. Examples include:

(i) a method including reacting the diisocyanate (a) and the polyol (b) in the presence of a solvent to produce a compound (hereinafter, also referred to as "component (d)") comprising a urethane bond, having isocyanate at both ends, and thereafter reacting the component (a), the component (d) and the end-capping agent (c) in the presence of a catalyst for carbodiimidization and end-capping;

(ii) a method including producing a polycarbodiimide (hereinafter, also referred to as "component (e)") by reacting the diisocyanate (a) in the presence of a solvent and a catalyst, and then adding the polyol (b) and the end-capping agent (c) to the component (e) and reacting them for copolymerization and end-capping; and (iii) a method including reacting the diisocyanate (a), the polyol (b) and the end-capping agent (c) in the presence of a solvent and a catalyst for urethanization, carbodiimidization and end-capping.

Among them, the polycarbodiimide copolymer is preferably produced according to the method (i) from the viewpoint of productivity. Specifically, preferably, the diisocyanate (a) and the polyol (b) are mixed so that an isocyanate group of the diisocyanate (a) is excessive relative to a hydroxyl group of the polyol (b), to perform a urethanization reaction, and the end-capping agent (c), and an organophosphorus compound or an organometallic compound serving as a carbodiimidization catalyst is then added to perform a carbodiimidization reaction in the absence of a solvent or in an inert solvent.

Specific examples of the carbodiimidization catalyst include 3-methyl-1-phenyl-2-phospholene-1-oxide, 3-methyl-1-ethyl-2-phospholene-1-oxide, 1,3-dimethyl-2-phospholene-1-oxide, 1-phenyl-2-phospholene-1-oxide, 1-ethyl-2-phospholene-1-oxide and 1-methyl-2-phospholene-1-oxide. Among them, preferable is 3-methyl-1-phenyl-2-phospholene-1-oxide which is industrially available. Such carbodiimidization catalysts may be used singly or in combinations of two or more kinds thereof.

The reaction temperature of the urethanization reaction of the component (a) and the component (b) can be appropriately set depending on raw materials to be used, and is preferably 30 to 200° C., more preferably 40 to 150° C., further preferably 50 to 120° C. from the viewpoint of productivity.

The reaction temperature of the carbodiimidization reaction is preferably 40 to 250° C., more preferably 60 to 200° C., further preferably 80 to 150° C. from the viewpoint of productivity.

The reaction time for the carbodiimidization reaction is preferably 2 to 20 hours, more preferably 3 to 15 hours, further preferably 4 to 10 hours from the same viewpoint.

The amount of the carbodiimidization catalyst to be used can be appropriately set depending on the type of the catalyst used, and is preferably 0.01 to 10 parts by mass, more preferably 0.05 to 5 parts by mass, further preferably 0.1 to 3 parts by mass based on 100 parts by mass of the diisocyanate (a).

Curing Agent of Carboxy Group-Containing Resin

A curing agent according to one aspect of the present invention comprises the polycarbodiimide copolymer of the present invention. The curing agent can be used to thereby effectively cure a carboxy group-containing resin composition. A preferable curing temperature is 90 to 180° C. A curing temperature of 90 to 180° C. not only can allow a carboxy group-containing resin composition to be sufficiently cured, but also can allow degradation due to heating of a main agent (resin) and/or a substrate, and yellowing or the like of a resin cured to be suppressed.

Herein, the curing agent may also comprise other common curing agent such as an epoxy compound, an oxazoline compound or an isocyanate compound, in addition to the polycarbodiimide copolymer, as long as the effect by the polycarbodiimide copolymer acting as a curing agent is not impaired.

Carboxy Group-Containing Resin Composition

A carboxy group-containing resin composition according to one aspect of the present invention comprises the curing agent in the aspect, and a carboxy group-containing resin. The resin comprised in the carboxy group-containing resin composition is not particularly limited as long as the resin cross-links with a carbodiimide group. A preferable carboxy group-containing resin is at least one selected from the group consisting of a polyurethane resin, a polyamide resin, an acrylic resin, a vinyl acetate resin, a polyolefin resin and a polyimide resin from the viewpoint of easiness of the crosslinking reaction with a carbodiimide group.

Amount of Polycarbodiimide Copolymer Added

The carboxy group-containing resin composition in the aspect is added such that the polycarbodiimide copolymer comprised in the curing agent in the aspect is, for example, preferably in an amount of 0.5 to 1.5 molar equivalents, more preferably 0.8 to 1.2 molar equivalents based on 1 molar equivalent of a functional group of a main agent (resin).

The carboxy group-containing resin composition in the aspect may contain, if necessary, appropriately compounded solvent and various additive components such as a pigment, a filler, a leveling agent, a surfactant, a dispersant, a plasticizer, an ultraviolet absorber and an antioxidant, depending on the intended use and the like.

Modified Polycarbodiimide Copolymer

The modified polycarbodiimide copolymer of the present invention is obtained by modifying the polycarbodiimide copolymer with an aliphatic amine or an aromatic heterocyclic amine.

Aliphatic Amine

A preferable aliphatic amine can block a carbodiimide group of the polycarbodiimide copolymer, and not only dissociates from the modified polycarbodiimide copolymer at a relatively high temperature, but also is high in dissociation property.

A preferable aliphatic amine for use in the modified polycarbodiimide copolymer of the present invention is at least one selected from the group consisting of diethylamine, diisopropylamine, methylisopropylamine, tert-butylethylamine, di-sec-butylamine, dicyclohexylamine, 2-methylpiperidine and 2,6-dimethylpiperidine, a more preferable aliphatic amine is at least one selected from the group consisting of diethylamine, diisopropylamine, tert-butylethylamine, di-sec-butylamine, dicyclohexylamine, 2-methylpiperidine and 2,6-dimethylpiperidine, a further preferable aliphatic amine is at least one selected from the group consisting of diethylamine, diisopropylamine, tert-butylethylamine, di-sec-butylamine, dicyclohexylamine and 2-methylpiperidine, and a particularly preferable aliphatic amine is diisopropylamine.

Aromatic Heterocyclic Amine

The aromatic heterocyclic amine for use in the modified polycarbodiimide copolymer of the present invention is not particularly limited as long as it is an aromatic heterocyclic amine having endocyclic secondary amine nitrogen. Here, the aromatic heterocyclic amine having endocyclic secondary amine nitrogen refers to a compound having an amine in a heterocycle.

The aromatic heterocyclic amine is preferably a heterocyclic amine having 2 or more endocyclic nitrogen atoms, more preferably at least one aromatic heterocyclic compound selected from the group consisting of an unsubstituted or substituted pyrazole and an unsubstituted or substituted imidazole, further preferably at least one selected from the group consisting of 3,5-dimethylpyrazole, imidazole, 2-methylimidazole, 2-ethyl-4-methyl-imidazole, 2-phenylimidazole and 2-phenyl-4-methylimidazole from the viewpoint of a low starting temperature of dissociation from the modified polycarbodiimide copolymer.

The carbodiimide group blocked by the aliphatic amine or the aromatic heterocyclic amine is low in reactivity with a carboxy group, and thus almost does not cure the carboxy group-containing resin composition. The aliphatic amine or the aromatic heterocyclic amine, however, dissociates from the modified polycarbodiimide copolymer, thereby allowing the carbodiimide group blocked to return to a carbodiimide group not modified with the aliphatic amine or the aromatic heterocyclic amine. A carbodiimide group is high in reactivity with a carboxy group, and thus the carboxy group-containing resin composition is thermally cured by a carbodiimide group generated by dissociation of the aliphatic amine or the aromatic heterocyclic amine from the modified polycarbodiimide copolymer. The aliphatic amine or the aromatic heterocyclic amine, in the case of being high in dissociation property from the modified polycarbodiimide copolymer, results in an increase in the number of carbodiimide groups generated from carbodiimide groups blocked, resulting in promotion of curing the carboxy group-containing resin composition.

For example, in the case where the polycarbodiimide copolymer is modified with the aliphatic amine and the aliphatic amine is diisopropylamine, a carbodiimide group represented by the following formula (2) corresponds to a carbodiimide group blocked, represented by the following formula (3). The carbodiimide group blocked of formula (3) is low in reactivity with a carboxy group due to steric hindrance of a moiety represented by the following formula (4) of formula (3). Such diisopropylamine dissociates to thereby generate a high-reactive carbodiimide group of formula (2), and such a polycarbodiimide copolymer results in curing the carboxy group-containing resin composition.

For example, in the case where the polycarbodiimide copolymer is modified with the aromatic heterocyclic amine and the aromatic heterocyclic amine is 3,5-dimethylpyrazole, the carbodiimide group represented by formula (2) corresponds to a carbodiimide group blocked, represented by the following formula (5). Such 3,5-dimethylpyrazole dissociates to thereby allow the carbodiimide group blocked of formula (3) to return to a high-reactive carbodiimide group of formula (2), and such a polycarbodiimide copolymer results in curing the carboxy group-containing resin composition.

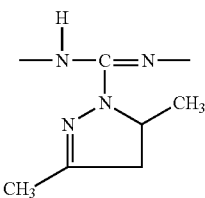

(5)

Method for Producing Modified Polycarbodiimide Copolymer

As described above, the modified polycarbodiimide copolymer of the present invention is obtained by blocking a carbodiimide group by the aliphatic amine or the aromatic heterocyclic amine to modify the polycarbodiimide copolymer. Such modification of the polycarbodiimide copolymer with the aliphatic amine or the aromatic heterocyclic amine can also be performed, for example, in no solvent, or by mixing the polycarbodiimide copolymer with an organic solvent, adding thereto the aliphatic amine or the aromatic heterocyclic amine so that the equivalent of the aliphatic amine or the aromatic heterocyclic amine relative to a carbodiimide group becomes a predetermined value, and stirring to react.

In the case of use of an organic solvent, the amount of the aliphatic amine or the aromatic heterocyclic amine added is preferably 1 to 2 molar equivalents based on 1 molar equivalent of a carbodiimide group, and is more preferably 1 to 1.2 molar equivalents from the viewpoints of suppression of an excessive amount of the amine and easiness of volatilization of the amine in a heating treatment. The reaction temperature in the modification of the polycarbodiimide copolymer with the aliphatic amine or the aromatic heterocyclic amine is preferably ordinary temperature (about 25° C.) or 40 to 80° C. from the viewpoints of the reaction speed and suppression of a side reaction in the blocking of a carbodiimide group. The reaction in the modification is preferably performed with stirring and the reaction time is preferably about 0.1 to 10 hours, although varied depending on the temperature.

Curing Agent of Carboxy Group-Containing Resin

A curing agent according to another aspect of the present invention comprises the modified polycarbodiimide copolymer of the present invention. The curing agent can be used to thereby allow the drying temperature of the carboxy group-containing resin composition to be set to a temperature lower than the starting temperature of dissociation of the aliphatic amine or the aromatic heterocyclic amine from the modified polycarbodiimide copolymer, and allow curing the carboxy group-containing resin composition in a drying step to be suppressed.

The thermosetting temperature of the carboxy group-containing resin composition can be set to a temperature higher than the starting temperature of dissociation of the aliphatic amine or the aromatic heterocyclic amine from the modified polycarbodiimide copolymer, thereby allowing the carboxy group-containing resin composition to be certainly cured in a thermally curing step. The thermosetting temperature of the carboxy group-containing resin composition can also be set to a relatively low temperature. A preferable thermosetting temperature is 90 to 180° C. A thermosetting temperature of 90 to 180° C. not only enables the thermosetting resin composition to be sufficiently cured, but also enables degradation of a main agent (resin) and a substrate due to heating, yellowing of a resin cured, and the like to be suppressed.

The curing agent of another aspect may comprise the polycarbodiimide copolymer unmodified.

Carboxy Group-Containing Resin Composition

A carboxy group-containing resin composition according to another aspect of the present invention comprises the curing agent of another aspect and a carboxy group-containing resin. The resin comprised in the carboxy group-containing resin composition is not particularly limited as long as it is a resin which can cross-linke with a carbodiimide group. A preferable carboxy group-containing resin is at least one selected from the group consisting of a polyurethane resin, a polyamide resin, an acrylic resin, a vinyl acetate resin, a polyolefin resin and a polyimide resin from the viewpoint of easiness of the crosslinking reaction with a carbodiimide group.

Amount of Modified Polycarbodiimide Copolymer Added

The carboxy group-containing resin composition of another aspect is added such that the modified polycarbodiimide copolymer comprised in the curing agent of another aspect is, for example, preferably in an amount of 0.5 to 1.5 molar equivalents, more preferably 0.8 to 1.2 molar equivalents based on 1 molar equivalent of a functional group of a main agent (resin).

The carboxy group-containing resin composition in another aspect may contain, if necessary, appropriately compounded solvent and various additive components such as a pigment, a filler, a leveling agent, a surfactant, a dispersant, a plasticizer, an ultraviolet absorber and an antioxidant, depending on the intended use and the like.

EXAMPLES

Hereinafter, the present invention will be more specifically described with reference to Examples and Comparative Examples, but the present invention is not intended to be limited thereto.

Production of Polycarbodiimide Copolymer

Example 1 (Synthesis of Polycarbodiimide Copolymer P1)

A reaction vessel equipped with a reflux tube and a stirrer was charged with 100 parts by mass of tolylene diisocyanate, 144 parts by mass of a castor oil-based polyol ("URIC H-30" manufactured by Itoh Oil Chemical Co., Ltd., the number of functional groups: 2.7), 49.9 parts by mass of phenyl isocyanate and 402 parts by mass of toluene, and the resultant was stirred under a nitrogen stream at 100° C. for 1 hour. Next, 1.5 parts by mass of 3-methyl-1-phenyl-2-phospholene-1-oxide as a carbodiimidization catalyst was added thereto and the resultant was stirred at 100° C. for 6 hours, it was confirmed by infrared (IR) absorption spectrum measurement that an absorption peak attributed to an isocyanate group at a wavelength of about 2270 cm$^{-1}$ almost disappeared, and a solution of polycarbodiimide copolymer P1 in toluene was obtained.

Comparative Example 1 (Synthesis of Polycarbodiimide Compound P9)

A reaction vessel equipped with a reflux tube and a stirrer was charged with 100 parts by mass of tolylene diisocyanate, 34.2 parts by mass of phenyl isocyanate, 163 parts by mass of toluene and 1.3 parts by mass of 3-methyl-1-phenyl-2-phospholene-1-oxide as a carbodiimidization catalyst, the resultant was stirred under a nitrogen stream at 100° C. for 3 hours, it was confirmed by IR spectrum measurement that an absorption peak attributed to an isocyanate group at a wavelength of about 2270 cm$^{-1}$ almost disappeared, and a solution of polycarbodiimide compound P9 in toluene was obtained.

Examples 2 to 8 and Comparative Examples 2 to 3 (Synthesis of Polycarbodiimide Copolymers P2 to P8, P10 and P11)

Each of polycarbodiimide copolymers P2 to P8, P10 and P11 was obtained in the same manner as in Example 1 except that the composition of raw materials in Example 1 was changed to each condition described in Table 1 below.

TABLE 1

| | | Example 1 | Example 2 | Example 3 | Example 4 | Example 5 | Example 6 |
|---|---|---|---|---|---|---|---|
| Polycarbodiimide copolymer/ polycarbodiimide compound | | P1 | P2 | P3 | P4 | P5 | P6 |
| Diisocyanate (a) | (Type) | TDI | TDI | TDI | TDI | TDI | TDI |
| | [parts by mass] | 100 | 100 | 100 | 100 | 100 | 100 |
| Polyol (b) | (Type) | A | B | C | D | E | A |
| | [parts by mass] | 144 | 101 | 106 | 144 | 240 | 144 |
| End-capping agent (c) | (Type) | PhNCO | PhNCO | PhNCO | PhNCO | PhNCO | PhNCO |
| | [parts by mass] | 49.9 | 34.2 | 34.2 | 34.2 | 34.2 | 49.9 |
| Toluene | [parts by mass] | 402 | 314 | 323 | 379 | 523 | 402 |
| Carbodiimidization catalyst | [parts by mass] | 1.5 | 1.3 | 1.3 | 1.3 | 1.3 | 1.5 |
| Urethanization reaction temperature | [° C.] | 100 | 100 | 100 | 100 | 100 | 100 |
| Urethanizization reaction time | [hour] | 1 | 1 | 1 | 1 | 1 | 1 |
| Carbodiimidization reaction temperature | [° C.] | 100 | 100 | 100 | 100 | 100 | 100 |
| Carbodiimidization reaction time | [hour] | 6 | 6 | 6 | 6 | 6 | 6 |

| | | Example 7 | Example 8 | Comparative Example 1 | Comparative Example 2 | Comparative Example 3 |
|---|---|---|---|---|---|---|
| Polycarbodiimide copolymer/ polycarbodiimide compound | | P7 | P8 | P9 | P10 | P11 |
| Diisocyanate (a) | (Type) | MDI | TODI | TDI | TDI | TDI |
| | [parts by mass] | 100 | 100 | 100 | 100 | 100 |
| Polyol (b) | (Type) | E | E | — | F | G |
| | [parts by mass] | 167 | 158 | — | 101 | 101 |
| End-capping agent (c) | (Type) | PhNCO | PhNCO | PhNCO | PhNCO | PhNCO |
| | [parts by mass] | 23.8 | 22.5 | 34.2 | 34.2 | 34.2 |
| Toluene | [parts by mass] | 409 | 396 | 163 | 314 | 314 |
| Carbodiimidization catalyst | [parts by mass] | 1.2 | 1.2 | 1.3 | 1.3 | 1.3 |
| Urethanization reaction temperature | [° C.] | 100 | 100 | — | 100 | 100 |
| Urethanizization reaction time | [hour] | 1 | 1 | — | 1 | 1 |
| Carbodiimidization reaction temperature | [° C.] | 100 | 100 | 100 | 100 | 100 |
| Carbodiimidization reaction time | [hour] | 6 | 6 | 3 | 6 | 6 |

The detail of the composition of raw materials in Table 1 is as follows.

<Diisocyanate (a)>

TDI: tolylene diisocyanate (mixture: 2,4-tolylene diisocyanate (80% by mass) and 2,6-tolylene diisocyanate (20% by mass))

MDI: 4,4'-diphenylmethane diisocyanate

TODI: 4,4'-diisocyanato-3,3'-dimethylbiphenyl

<Polyol (b)>

A: castor oil-based polyol "URIC H-30" manufactured by Itoh Oil Chemical Co., Ltd., the number of functional groups: 2.7

B: castor oil-based polyol "URIC Y-403" manufactured by Itoh Oil Chemical Co., Ltd., the number of functional groups: 2

C: castor oil-based polyol "HS 2G-160R" manufactured by Hokoku Co., Ltd., the number of functional groups: 2

D: liquid polybutadiene having hydroxyl group at end, "Poly bd (registered trademark) R-15HT" manufactured by Idemitsu Kosan Co., Ltd., number average molecular weight: 1000

E: hydrogenated polybutadiene having hydroxyl groups at both ends, "GI-1000" manufactured by Nippon Soda Co., Ltd., number average molecular weight: 1500

F: polytetramethylene glycol "PB-700" manufactured by NOF Corporation, number average molecular weight: 700

G: polycarbonate diol, "Duranol (registered trademark) T-5650J" manufactured by Asahi Kasei Corporation, number average molecular weight: 700

<End-Capping Agent (c)>

PhNCO: phenyl isocyanate

<Carbodiimidization Catalyst>

3-methyl-1-phenyl-2-phospholene-1-oxide

Production of Modified Polycarbodiimide Copolymer

Example 9 (Production of Modified Polycarbodiimide Copolymer PP1)

59.3 parts by mass of diisopropylamine was added to the solution of polycarbodiimide copolymer P1 in toluene, obtained in Example 1, the resultant was stirred at room temperature (r.t.: about 25° C.) for 5 hours, it was confirmed by IR spectrum measurement that an absorption peak attributed to a guanidine group at a wavelength of about 1740 $cm^{-1}$ appeared and that an absorption peak attributed to a carbodiimide group at a wavelength of about 2150 $cm^{-1}$ almost disappeared, and a solution of modified polycarbodiimide copolymer PP1 in toluene was obtained.

Comparative Example 4 (Production of Modified Polycarbodiimide Compound PP9)

59.3 parts by mass of diisopropylamine was added to the solution of polycarbodiimide compound P9 in toluene, obtained in Comparative Example 1, the resultant was stirred at room temperature for 5 hours, it was confirmed by IR spectrum measurement that an absorption peak attributed to a guanidine group at a wavelength of about 1740 $cm^{-1}$ appeared and that an absorption peak attributed to a carbodiimide group at a wavelength of about 2150 $cm^{-1}$ almost disappeared, and a modified polycarbodiimide compound PP9 was obtained.

Examples 10 to 16, and Comparative Examples 5 and 6 (Production of Modified Polycarbodiimide Copolymers PP2 to PP8, PP10 and PP11)

Each of modified polycarbodiimide copolymers PP2 to PP8, PP10 and PP11 was obtained in the same manner as in Example 6 except that the composition of raw materials in Example 9 was changed to each condition described in Table 2 below.

TABLE 2

| | | Example 9 | Example 10 | Example 11 | Example 12 | Example 13 | Example 14 |
|---|---|---|---|---|---|---|---|
| Modified polycarbodiimide copolymer/modified polycarbodiimide compound | | PP1 | PP2 | PP3 | PP4 | PP5 | PP6 |
| Polycarbodiimide copolymer/polycarbodiimide compound | | P1 | P2 | P3 | P4 | P5 | P6 |
| Amine compound | (Type) | DIPA | DIPA | DIPA | DIPA | DIPA | DsBA |
| | [parts by mass] | 59.3 | 59.3 | 59.3 | 59.3 | 59.3 | 75.8 |
| Reaction temperature | [° C.] | r.t. | r.t. | r.t. | r.t. | r.t. | r.t. |
| Reaction time | [hour] | 5 | 5 | 5 | 5 | 5 | 5 |

| | | Example 15 | Example 16 | Comparative Example 4 | Comparative Example 5 | Comparative Example 6 |
|---|---|---|---|---|---|---|
| Modified polycarbodiimide copolymer/modified polycarbodiimide compound | | PP7 | PP8 | PP9 | PP10 | PP11 |
| Polycarbodiimide copolymer/polycarbodiimide compound | | P7 | P8 | P9 | P10 | P11 |
| Amine compound | (Type) | DIPA | DIPA | DIPA | DIPA | DIPA |
| | [parts by mass] | 41.3 | 39.1 | 59.3 | 59.3 | 59.3 |
| Reaction temperature | [° C.] | r.t. | r.t. | r.t. | r.t. | r.t. |
| Reaction time | [hour] | 5 | 5 | 5 | 5 | 5 |

The detail of each amine compound in Table 2 is as follows.
DIPA: diisopropylamine
DsBA: di-sec-butylamine Production of Carboxy Group-Containing Resin Composition Example 17

10 parts by mass of polycarbodiimide copolymer P1 obtained in Example 1 was mixed with 100 parts by mass of a solution of an amorphous polyester resin ("Vylon (registered trademark) 296" manufactured by Toyobo Co., Ltd.) in toluene (concentration: 30% by mass), thereby providing a carboxy group-containing resin composition.

The carboxy group-containing resin composition was cast on a release polyethylene terephthalate (PET) film and dried at 80° C. for 5 minutes, thereby preparing an uncured film having a thickness of 100 μm. The uncured film was dried at 170° C. for 1 hour with being provided with the release PET film, thereby curing the resin, thereby preparing a cured film.

The cured film was used to perform a flexibility test and a water resistance test. The results of the respective tests are shown in Table 3 below.

Examples 18 to 34 and Comparative Examples 7 to 12

Each carboxy group-containing resin composition was prepared and also each cured film was prepared in the same manner as in Example 17 except that the polycarbodiimide copolymer and the carboxy group-containing resin were changed to each condition described in Table 3 below. Such each cured film was used to perform a flexibility test and a water resistance test.

Here, acrylic resin B used as the carboxy group-containing resin was used as it was in the form of a product without any dilution with toluene.

The storage stability test of the carboxy group-containing resin composition was also performed in Examples 26 to 34 and Comparative Examples 10 to 12 where the modified polycarbodiimide copolymer was used. The results of the respective tests are shown in Table 3 below.

The evaluation methods in the respective tests are as follows.

Flexibility Test

Folding of each of the cured films prepared was made, and one that was inferior in flexibility and thus cracked was rated as "Poor" and one whose shape returned to the original shape without any cracking was rated as "Good".

Water Resistance Test

A strip sheet having a size of 10 mm×70 mm was prepared from each of the cured films prepared, and the tensile strength and the elongation strength were measured by a tensile tester. Thereafter, the strip sheet prepared was placed in a highly accelerated life test apparatus ("HAST CHAMBER EHS-210M" manufactured by Espec Corp.), such a sample was taken out after a lapse of 24 hours and after a lapse of 40 hours under conditions of 121° C. and 100% RH, and the tensile strength and the tensile elongation of the strip sheet were measured by a tensile tester. The respective average values of the tensile strength and the tensile elongation were calculated before and after the test with respect to five sheets, and one where both the tensile strength retention rate and the tensile elongation retention rate calculated by the following expressions were more than 80% was rated as "Good" and one where at least one thereof was 80% or less was rated as "Poor". One rated as "Good" was kept in the strength of the cured film even under the heat and humidity environment, and thus was regarded as being excellent in water resistance.

Tensile strength retention rate [%]=(Average value of tensile strength after test)/(Average value of tensile strength before test)×100

Tensile elongation retention rate [%]=(Average value of tensile elongation after test)/(Average value of tensile elongation before test)×100

Storage Stability Test

The carboxy group-containing resin composition prepared was placed under an environment of 40° C., and the presence of gelation after a predetermined period was observed. One where gelation was observed within 96 hours was rated as "Poor" and one where no gelation was observed after more than 96 hours was rated as "Good".

TABLE 3

| | | Example 17 | Example 18 | Example 19 | Example 20 | Example 21 | Example 22 |
|---|---|---|---|---|---|---|---|
| Polycarbodiimide copolymer/ polycarbodiimide compound | | P1 | P1 | P2 | P3 | P4 | P5 |
| Carboxy group-containing resin | | A | B | B | B | B | B |
| Flexibility test | | Good | Good | Good | Good | Good | Good |
| Water resistance test | | | | | | | |
| Tensile strength retention rate | After 24 hours | Good | Good | Good | Good | Good | Good |
| | After 48 hours | Good | Good | Good | Good | Good | Good |
| Tensile elongation retention rate | After 24 hours | Good | Good | Good | Good | Good | Good |
| | After 48 hours | Good | Good | Good | Good | Good | Good |

| | | Example 23 | Example 24 | Example 25 | Comparative Example 7 | Comparative Example 8 | Comparative Example 9 |
|---|---|---|---|---|---|---|---|
| Polycarbodiimide copolymer/ polycarbodiimide compound | | P6 | P7 | P8 | P9 | P10 | P11 |
| Carboxy group-containing resin | | B | B | B | B | B | B |
| Flexibility test | | Good | Good | Good | Poor | Good | Good |

TABLE 3-continued

| Water resistance test | | | | | | | |
|---|---|---|---|---|---|---|---|
| Tensile strength retention rate | After 24 hours | Good | Good | Good | Good | Poor | Poor |
| | After 48 hours | Good | Good | Good | Good | Poor | Poor |
| Tensile elongation retention rate | After 24 hours | Good | Good | Good | Good | Poor | Poor |
| | After 48 hours | Good | Good | Good | Good | Poor | Poor |

| | | Example 26 | Example 27 | Example 28 | Example 29 | Example 30 | Example 31 |
|---|---|---|---|---|---|---|---|
| Modified polycarbodiimide copolymer/modified polycarbodiimide compound | | PP1 | PP1 | PP2 | PP3 | PP4 | PP5 |
| Carboxy group-containing resin | | A | B | B | B | B | B |
| Storage stability test | | Good | Good | Good | Good | Good | Good |
| Flexibility test | | Good | Good | Good | Good | Good | Good |
| Water resistance test | | | | | | | |
| Tensile strength retention rate | After 24 hours | Good | Good | Good | Good | Good | Good |
| | After 48 hours | Good | Good | Good | Good | Good | Good |
| Tensile elongation retention rate | After 24 hours | Good | Good | Good | Good | Good | Good |
| | After 48 hours | Good | Good | Good | Good | Good | Good |

| | | Example 32 | Example 33 | Example 34 | Comparative Example 10 | Comparative Example 11 | Comparative Example 12 |
|---|---|---|---|---|---|---|---|
| Modified polycarbodiimide copolymer/modified polycarbodiimide compound | | PP6 | PP7 | PP8 | PP9 | PP10 | PP11 |
| Carboxy group-containing resin | | B | B | B | B | B | B |
| Storage stability test | | Good | Good | Good | Good | Good | Good |
| Flexibility test | | Good | Good | Good | Poor | Good | Good |
| Water resistance test | | | | | | | |
| Tensile strength retention rate | After 24 hours | Good | Good | Good | Good | Poor | Poor |
| | After 48 hours | Good | Good | Good | Good | Poor | Poor |
| Tensile elongation retention rate | After 24 hours | Good | Good | Good | Good | Poor | Poor |
| | After 48 hours | Good | Good | Good | Good | Poor | Poor |

The detail of each carboxy group-containing resin in Table 3 is as follows.
A: polyester resin "Vylon (registered trademark) 296" manufactured by Toyobo Co., Ltd., number average molecular weight: 14000, acid value: 6
B: acrylic resin "Acrydic A-814" manufactured by DIC Corporation, non-volatile content: 44.0 to 46.0% by mass (solvent: toluene, vinyl acetate), acid value (solution): 2.0 to 4.0

It was found from the evaluation results shown in Table 3 that a lower polarity of the soft segment for imparting flexibility resulted in suppressed moisture-absorption properties to thereby enable the strengths (tensile strength and elongation strength) to be retained under the heat and humidity environment in Examples. On the other hand, the soft segment contained a large number of chemical bonds high in polarity to result in deterioration in the strengths under the heat and humidity environment in Comparative Examples.

A cured product of the polycarbodiimide copolymer composition of the present invention is excellent in flexibility and water resistance, and can be suitably used in paint and the like.

The invention claimed is:

1. A polycarbodiimide copolymer comprising:
a soft segment comprising a residue in which hydroxyl groups are removed from at least one polyol selected from the group consisting of castor oil, a castor oil-based polyol having 2 to 10 functional groups, and a long-chain aliphatic diol represented by HO-R$^1$-OH
wherein R$^1$ represents a linear or branched, saturated or unsaturated alkylene group containing 30 to 150 carbon atoms, and
a hard segment composed of polycarbodiimide derived from an aromatic diisocyanate compound, the hard segment bonding to the soft segment through a urethane bond, and
wherein an end isocyanate remaining as an end of the hard segment is capped with an end-capping agent, and the polyol is castor oil or a castor oil-based polyol having 2 to 10 functional groups.

2. The polycarbodiimide copolymer according to claim 1, wherein the aromatic diisocyanate is at least one selected from the group consisting of 4,4'-diphenylmethane diisocyanate, 2,4-tolylene diisocyanate, 2,6-tolylene diisocyanate and 4,4'-diisocyanato-3,3'-dimethylbiphenyl.

3. A curing agent of a carboxy group-containing resin, comprising the polycarbodiimide copolymer according to claim 1.

4. A carboxy group-containing resin composition comprising the curing agent according to claim 3 and a carboxy group-containing resin.

5. A modified polycarbodiimide copolymer obtained by modifying the polycarbodiimide copolymer according to claim 1 with an aliphatic amine or an aromatic heterocyclic amine.

6. The modified polycarbodiimide copolymer according to claim 5, wherein the aliphatic amine is at least one selected from the group consisting of diethylamine, diisopropylamine, tert-butylethylamine, di-n-butylamine, di-sec-butylamine, di-tert-butylamine, dicyclohexylamine, 2-methylpiperidine and 2,6-dimethylpiperidine.

7. The modified polycarbodiimide copolymer according to claim 6, wherein the aliphatic amine is diisopropylamine.

8. The modified polycarbodiimide copolymer according to claim 5, wherein the aromatic heterocyclic amine is at least one selected from the group consisting of 3,5-dimethylpyrazole, imidazole, 2-methylimidazole, 2-ethyl-4-methylimidazole, 2-phenylimidazole and 2-phenyl-4-methylimidazole.

9. A curing agent of a carboxy group-containing resin, comprising the modified polycarbodiimide copolymer according to claim 5.

10. A carboxy group-containing resin composition comprising the curing agent according to claim 9 and a carboxy group-containing resin.

11. The polycarbodiimide copolymer according to claim 1, wherein the end-capping agent comprises a monoalcohol, a monophenol, a monoisocyanate or a monoamine.

12. The polycarbodiimide copolymer according to claim 1, wherein the end-capping agent comprises a monoalcohol or a monoisocyanate.

13. The polycarbodiimide copolymer according to claim 1, wherein the end-capping agent comprises an aromatic monoisocyanate.

14. The polycarbodiimide copolymer according to claim 1, wherein the polyol is a castor oil-based polyol having 2 to 3 functional groups.

* * * * *